United States Patent

Glab et al.

[11] Patent Number: 5,979,584
[45] Date of Patent: Nov. 9, 1999

[54] FOUR-WHEEL DRIVE TRANSFER CASE CONTROLLER

[75] Inventors: John Glab, Riverview; Paul R. Longworth, Ann Arbor; Richard A. Martins, Dearborn, all of Mich.

[73] Assignee: Ford Global Technologies, Inc., Dearborn, Mich.

[21] Appl. No.: 08/900,797

[22] Filed: Jul. 25, 1997

[51] Int. Cl.[6] .................................................. B60K 17/35
[52] U.S. Cl. ............................ 180/249; 180/248; 701/69
[58] Field of Search ................................... 180/197, 233, 180/245, 247, 248, 249; 701/69, 67, 68

[56] References Cited

U.S. PATENT DOCUMENTS

| | | |
|---|---|---|
| 3,656,573 | 4/1972 | Halberg . |
| 4,467,886 | 8/1984 | DeClaire et al. . |
| 4,718,303 | 1/1988 | Fogelberg . |
| 4,773,517 | 9/1988 | Watanabe . |
| 4,884,653 | 12/1989 | Kouno . |
| 4,961,476 | 10/1990 | Witte et al. . |
| 4,989,686 | 2/1991 | Miller et al. . |
| 4,991,678 | 2/1991 | Furuya et al. . |
| 5,032,995 | 7/1991 | Matsuda et al. . |
| 5,060,747 | 10/1991 | Eto . |
| 5,215,160 | 6/1993 | Williams et al. . |
| 5,219,038 | 6/1993 | Hamada et al. . |
| 5,330,030 | 7/1994 | Eastman et al. ......................... 180/233 |
| 5,332,060 | 7/1994 | Sperduti et al. ......................... 180/197 |
| 5,409,429 | 4/1995 | Showalter et al. ....................... 180/197 |
| 5,461,568 | 10/1995 | Morita . |
| 5,479,348 | 12/1995 | Sasaki . |
| 5,485,894 | 1/1996 | Watson et al. ........................... 180/248 |
| 5,522,777 | 6/1996 | Baxter et al. ............................ 180/247 |
| 5,605,201 | 2/1997 | McGinn et al. ......................... 180/233 |
| 5,609,219 | 3/1997 | Watson et al. ........................... 180/248 |
| 5,695,022 | 12/1997 | Zalewski .................................. 180/249 |
| 5,704,444 | 1/1998 | Showalter et al. ....................... 180/247 |
| 5,752,211 | 5/1998 | Takasaki et al. .......................... 701/69 |
| 5,809,443 | 9/1998 | Perttunen et al. ......................... 701/69 |
| 5,819,194 | 10/1998 | Hara et al. ................................ 701/89 |

FOREIGN PATENT DOCUMENTS

| | | |
|---|---|---|
| 0298397 | 1/1989 | European Pat. Off. . |
| 0393596 | 10/1990 | European Pat. Off. . |

*Primary Examiner*—Lanna Mai
*Assistant Examiner*—Andrew J. Fischer
*Attorney, Agent, or Firm*—James J. Dottavio

[57] ABSTRACT

In a vehicle which includes a front driveshaft for transferring motive power to a front set of wheels and a rear driveshaft for transferring motive power to a rear set of wheels and a clutch to control the amount of torque provided to the driveshafts, a method is provided to control the amount of power delivered to the front and rear driveshafts. The duty cycle of the clutch is monitored and it is determined whether the clutch duty cycle passes a first lower threshold and a second higher threshold, successively, a predetermined number of times within a calibratible time period. A 4 Hi Lock mode is entered if the clutch duty cycle passes the first lower threshold and the second higher threshold, successively, a predetermined number of times within the calibratible period.

20 Claims, 10 Drawing Sheets

A    Ignition ON/ ◄──────────────── 11
       - Clear Spare_Tire_Sensed ◄──────── 12
       - Clear Spare_Tire_Qualified ◄──────── 13
       - Clear No_Spare_Tire_Sensed ◄──────── 14
       - Set Filter pole to 1 Hz ◄──────── 15

B    Auto Mode Selected ◄──────────────── 16
     - Set Increment_Clutch_Rate=Spare_Tire_Clutch_Inc ◄── 18
     -Set Autolock_zz_thresh2=zz_sense_thresh2 ◄──── 19
     -Set Shaft_error_counts=Shaft_Error_Sense_counts ◄── 20

C    Auto Mode Selected
     & NOT Spare_Tire_sensed
     & NOT No_Spare_Tire_sensed/

D    4HI/4LOW Mode Selected/
     - Set Increment_Clutch_Rate=Normal
     - Set Rear_Slip_Table=Normal
     - Set Shaft_error_counts=normal

E    No Spare Tire Sensed/
       - set increment_clutch_rate=normal
       - Set Rear_Slip_Table=Normal
       - Set Autolock_zz_thresh2=normal
       - Set Shaft_error_counts=normal

F    Spare Tire Sensed/
       - set rear slip values=
         (normal + Spare_Tire_Slip_Offset)
       - Clear "No_Spare_Tire_Counter

FIGURE 8A

| G | Brake Off & (Zero_Veh_Speed for > 10 Min.)
/Ignition Off/ |

| H | 4HI/4LOW Mode Selected/
- Set Increment_Clutch_Rate=Normal
- Set Rear_Slip_Table=Normal
- Set Shaft_error_counts=normal |

| J | Auto Mode Selected
& Spare_Tire_Qualified/
- Set rear Slip_Table_Values=
  (Normal+Spare_Tire_Slip_Offset)
- Set Increment_Clutch_Rate=Spare_Tire_Clutch_Inc
-Set Shaft_error_counts=Shaft_Error_Sense_Counts |

| K | Auto Mode Selected
& Spare_Tire_sensed
& NOT Spare_Tire_Qualified/
- Set rear Slip_Table_Values=
  (Normal+Spare_Tire_Slip_Offset)
- Set Increment_Clutch_Rate=Spare_Tire_Clutch_Inc
-Set Shaft_error_counts=Shaft_Error_Sense_Counts |

| L | 4HI/4LOW Mode Selected/
- Set Increment_Clutch_Rate=Normal
- Set Rear_Slip_Table=Normal
- Set Shaft_error_counts=normal |

FIGURE 8B

FOUR-WHEEL DRIVE TRANSFER CASE CONTROLLER

FIELD OF THE INVENTION

This invention relates to the field of electronic powertrain controllers, and more particularly to the field of four-wheel drive vehicles which utilize an electronic powertrain controller.

BACKGROUND OF THE INVENTION

As many people are aware, four-wheel drives vehicles provide traction often unattainable in two-wheel drive vehicles by delivering power to each of the vehicle's four wheels. Attendant with the added traction provided by four-wheel drive is the added complexity of the drive train required to control and deliver power to all four wheels as opposed to only two wheels. For instance, it is desirable to alter the delivery of power to the front wheels and the rear wheels depending upon whether the vehicle is turning, or is being driven on low traction surfaces such as rain, sand, snow or ice-covered surfaces. The delivery of power between the front wheels and the rear wheels of the vehicle is typically handled by a transfer case mechanism which includes either a mechanically or electronically controlled clutch.

In an all-wheel drive system (A4WD), both the front and rear pairs of wheels are continually in drivable engagement with the transfer case, but substantially all of the torque is transferred to one pair of wheels when no slippage is detected. When slippage is detected, a controller adjusts the duty cycle of an electronically controlled clutch to transfer the torque to the nonslipping wheels. Torque is thus transferred in a mode substantially like a two-wheel drive vehicle until slippage is detected.

The inventors herein have recognized that known transfer case control systems may experience excessive clutch cycling when the vehicle is operated in situations where the wheels experience slippage for an extended period, such as in sand or deep snow. In such an instance, the controller will detect slippage and cycle the clutch to adjust the torque split. This establishes traction, whereafter the controller readjusts the torque split, then detects slippage again. This causes a repeated cycling of the clutch during high torque demand, causing excessive wear of the clutch components. It would be desirable to detect such operating conditions and adjust the duty cycle of the clutch accordingly, without producing adverse effects, such as tire scrubbing on dry pavement.

Additionally, to maximize package space and reduce weight, it is desirable to provide a smaller spare tire in a motor vehicle. However, when a smaller spare tire is provided, the spare may have a smaller rolling radius than the other tires. A wheel having the smaller spare tire installed will therefore rotate at a higher angular velocity. Similarly when a tire has low air pressure, that wheel will have a smaller rolling radius and rotate at a higher angular velocity. In a four wheel drive system which provides a differential for a variation between front to rear velocities, the vehicle driveline controller will detect this higher angular velocity and mistake the higher angular velocity for a "false" wheel slippage. The controller will then transfer torque to the other, "nonslipping", wheels to ensure maximum traction to overcome this "false" slippage situation. The torque transfer to the "nonslipping" wheels causes the differential to cycle excessively and may create a situation where the driveline binds up, creating unacceptable drivability issues as well as potential driveline damage. These concerns are particularly evident in full time four wheel drive systems, where the operator of the vehicle cannot select two wheel drive when a spare tire used.

Strategies designed to compensate for this slip must try to satisfy conflicting vehicle requirements, namely, the need to provide torque to a wheel pair and the need to release the limited slip device to prevent bindup. Rapid release of the limited slip device to prevent bindup may lead to an extended cycling condition, which in turn may produce NVH problems and durability concerns in the limited slip device.

SUMMARY OF THE INVENTION

It is an object of the present invention to control a four-wheel drive mechanism in a vehicle in a manner which detects extended slippage situations and adjusts the duty cycle of the clutch accordingly to prevent excessive clutch cycling.

In accordance with the primary object of the invention, in a preferred embodiment, in a vehicle which includes a front driveshaft for transferring motive power to a front set of wheels and a rear driveshaft for transferring motive power to a rear set of wheels and a clutch to control the amount of torque provided to the driveshafts, a method is provided to control the amount of power delivered to the front and rear driveshafts. The duty cycle of the clutch is monitored and it is determined whether the clutch duty cycle passes a first lower threshold and a second higher threshold, successively, a predetermined number of times within a calibratible time period. A 4 Hi Lock mode is entered if the clutch duty cycle passes the first lower threshold and the second higher threshold, successively, a predetermined number of times within the calibratible period.

An advantage of the preferred embodiments is that the clutch will not be cycled excessively in A4WD mode under extended periods of slippage, such as when driving in sand. When excessive clutch cycling is detected, an Autolock mode is entered for a predetermined time period to reduce clutch cycling. During Autolock mode operation, if the vehicle speed exceeds a maximum or drops below a minimum, A4WD mode is re-entered. If another mode is selected by the driver, that mode is entered if such a selection is allowable.

Further advantages of the present invention include compensation for differing wheel diameters. This is accomplished by providing a method of monitoring the relative effective diameters of the tires and compensating therefor. Each of the wheels has an effective diameter. Front and rear driveshaft values indicative of the rotational speed of each driveshaft are generated. A difference value indicative of a difference between said front and rear driveshaft values is then generated. A low pass filtered value is generated according to the relationship of $Y_{1p}=(1-\beta)*U(k)+\beta*Y_{1p}(k-1)$. The low pass filtered value is monitored for a predetermined period of time to determine if one of the wheels has a smaller effective diameter than the other wheels.

In a preferred embodiment, the low pass filtered value is limited to a predetermined level and subtracted from the difference value to generate a high pass filtered value. A controller then controls the amount of power delivered to said front driveshaft and to said rear driveshaft, as a function of the high pass filtered value.

An advantage of certain preferred embodiments is that a smaller effective wheel diameter is detected at vehicle startup. Once a smaller effective wheel diameter is detected, the controller compensates for it. Furthermore, the low pass filtered value is limited so the drivetrain may be controlled to provide torque when the wheels are slipping at a low rate of slip buildup such as in sand.

These and other features and advantages of the present invention may be better understood by considering the following detailed description of a preferred embodiment of the invention. In the course of this description reference will frequently be made to the attached drawings.

BRIEF DESCRIPTION OF THE DRAWINGS

FIGS. 8, 8A and 8B illustrate a state machine including a preferred embodiment of the present invention.

DETAILED DESCRIPTION

Figure 1:
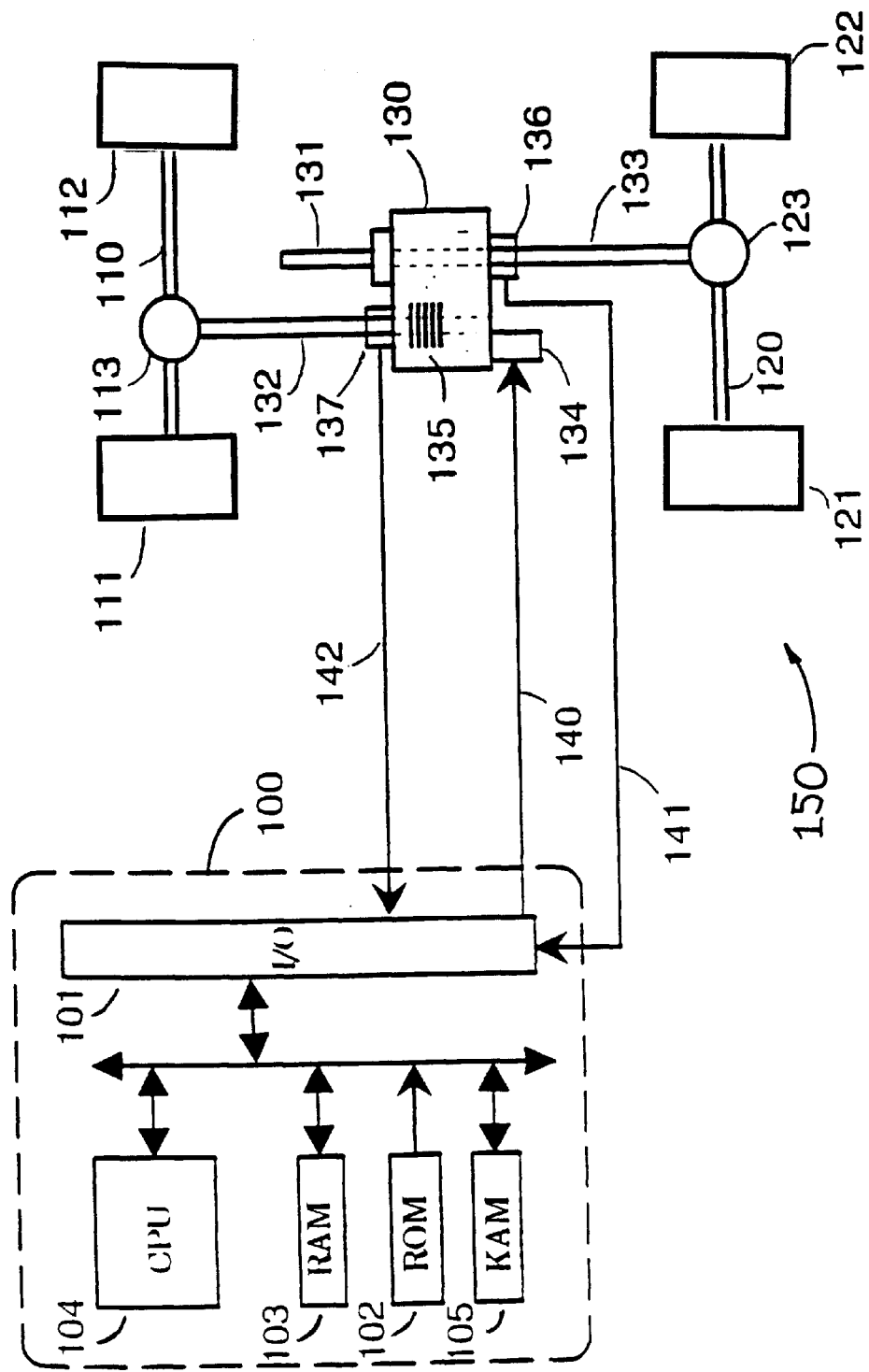
FIG. 1 shows a block diagram of a powertrain controller and a four-wheel drive powertrain which embody the principles of the invention.

In FIG. 1 of the drawings, a powertrain controller 100 controls the operation of a transfer case 130 of a four-wheel drive vehicle 150. The powertrain controller 100 preferably includes a central processing unit 104, a read-only memory (ROM) 102 for storing control programs, a random-access memory (RAM) 103 for temporary data storage, a keep-alive-memory (KAM) 105 for storing learned values, a conventional data bus and I/O ports x101 for transmitting and receiving signals to and from the transfer case 130. The transfer case 130 includes an electronically controlled clutch 135 for transferring motive power from an input shaft 131, which transmits power from an engine transmission, to front driveshaft 132 and rear driveshaft 133, in response to a clutch Pulse Width Modulated (PWM) signal 140 generated by powertrain controller 100. The transfer case 130 preferably takes a form as described in U.S. Pat. No. 4,718,303 to Mark J. Fogelberg entitled Four Wheel Drive Transfer Case With Clutch Mechanism" ('303 patent). The clutch 135 preferably takes a form as described in U.S. Pat. No. 4,989,686 to Miller et al. entitled "System For Controlling Torque Transmission In A Four Wheel Drive Vehicle" ('686 patent). Both of the above patents are hereby incorporated by reference.

As described in the '686 patent, the clutch 135 takes the form of an electromagnetic clutch which operates in accordance with a clutch PWM signal which controls the amount of slippage between friction plates of the clutch by altering a magnetic field causing movement of an apply plate which engages the friction plates, thereby controlling the amount of power delivered from the input shaft 131 to the front and rear driveshafts. The clutch when engaged, either fully or partially, preferably operates to add torque to the slower turning of the two driveshafts (front or rear) and to subtract torque from the faster turning driveshaft.

The front driveshaft 132 provides motive power to a front differential 113 which controls the amount of motive power delivered over a pair of front wheel shafts to a left front wheel 111 and a right front wheel 112. The rear driveshaft 133 provides motive power to a rear differential 123 which controls the amount of motive power delivered over a pair of wheel shafts to a left rear wheel 121 and a right rear wheel 122. A front driveshaft speed sensor 137 detects the rotational speed of the front driveshaft 132 and transmits a front driveshaft speed signal 142 to powertrain controller 100. A rear driveshaft speed sensor 136 detects the rotational speed of the rear driveshaft 133 and transmits a rear driveshaft speed signal 141 to powertrain controller 100. Sensors 137 and 136 are preferably conventional magnetic type sensors which transmit a pulse in response to rotation of each tooth on a gear or rotor secured to turn with the driveshaft, past the sensor. Thus, the frequency of signals 141 and 142 are proportional to the rotational speed of the respective driveshaft.

A preferred embodiment of the present invention advantageously generates clutch PWM signal 140 in a manner which adjusts the amount of power delivered by front driveshaft 132 and rear driveshaft 133 to compensate for differing effective diameters of wheels 111, 112, 121 or 122 as described in the copending U.S. patent application filed by Glab and Rodrigues, entitled, "Four-Wheel Drive Transfer Case Controller Compatible With a Spare Tire", filed Jun. 3, 1997, assigned to the assignee of the present invention. In a preferred embodiment, the transfer case is an A4WD transfer case known to one skilled in the art. The description herein thus describes the system with reference to A4WD system.

The wheels of a vehicle may have differing effective diameters, as described in U.S. Pat. No. 5,809,443, which is assigned to the assignee of the present application and is incorporated herein by reference. The operating strategy in the '443 patent filters wheel speed using a high pass filter. A low pass filter detects a spare tire, and a limit is further provided for the low pass filter. As described below, the low pass filter limit accommodates slippage in some situations, thereby improving traction and preventing damage to the transfer case.

For purposes of this description, "spare tire" is used to generally indicate a tire with a smaller effective diameter, which could result from differing inflation pressures or if the tires exhibit different flexing characteristics, or if a different size wheel or tire is installed ion the vehicle other than a spare tire.

Figure 6:
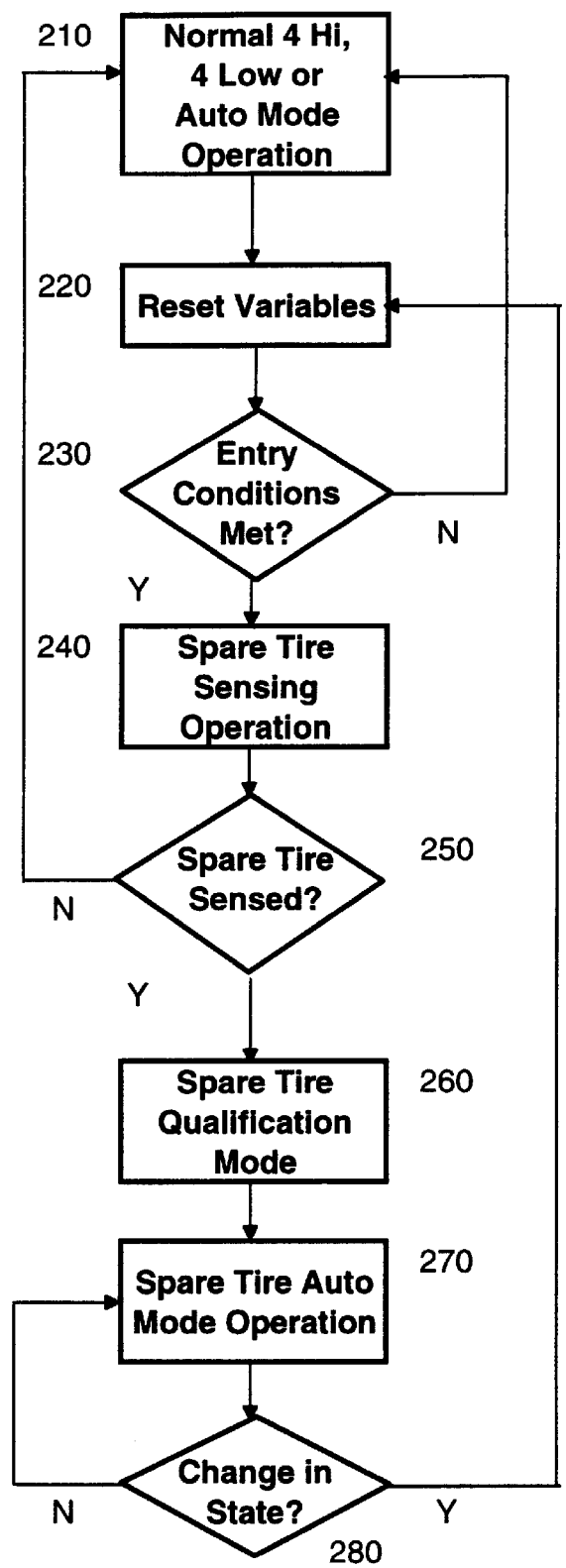
FIG. 6 is a flowchart of the steps executed in a preferred embodiment for spare tire analysis.

FIG. 6 of the drawings shows the steps of a clutch routine according to the present invention. The clutch routine uses a high-pass filter to filter front-to-rear wheel speed differences below approximately 1 Hz and limits the amount of slip based on a radius variation expected from the vehicle. Because the high pass filter comprises the speed difference minus the low pass filtered value, the high pass filter precludes reaction to rolling radius variations, but permits reaction to true slip events. The routine is executed by powertrain controller 100 as a portion of a stored program to adjust the operation of the limited slip device, including clutch 135, based on a sensed tire having a smaller rolling radius.

As shown in FIG. 6, the vehicle begins operation under a normal 4×2 or 4×4 mode 210, or alternatively in an AWD mode. When appropriate, and in a preferred embodiment only at vehicle startup, the controller 100 resets all variables to default, making no distinction that a spare tire is present 220. The spare tire sensing operation, as described below, is then run once after entry conditions are met. One skilled in the art appreciates that in an alternative embodiment, as described below, the detection may occur alternatively during various stages of operation.

At startup, the controller 100 thus clears the flags Spare_Tire_Sensed, No_Spare_Tire_Sensed, and Spare_Tire_Qualified. All other variables are reset to values indicating no spare tire is on the vehicle (i.e. the vehicle presumes no spare tire until one is sensed each time the vehicle is started). Once entry conditions are met 230, the controller 100 determines if a spare tire is present 240.

The entry conditions include whether the vehicle is operating at a speed above a calibratible speed (Spare_Tire_Speed_Thresh_Kph) and the clutch duty cycle is less than a calibratible duty cycle (Max_Spare_Sense_Duty_Cycle), existing for at least a calibratible time (Spare_Tire_Counts_Delay). Thus, before the vehicle tests whether a spare is present, the vehicle speed is preferably high enough to more accurately determine a difference in rotational speed. The clutch is preferably quiet (not engaging and disengaging) while the vehicle is traveling at such speed for a predetermined time period. Furthermore, the test is preferably run only at startup until the controller 100 determines whether a spare tire is present. To accomplish this, a Start_Up flag is reset to "Y" when the vehicle is started up, and the Start_Up flag is set to "N" when one of the spare tire flags described below is set. In a preferred embodiment, entry conditions also require operation in an A4WD mode, i.e. most or all torque being transferred to one pair of wheels, further providing a quiet clutch.

Once the entry conditions are met, the controller 100 enters a spare tire sensing mode 240 where the controller 100 determines whether a spare tire is present. This determination is made by establishing whether the Lowpass Filtered Delta Speed is greater than a calibratible threshold (Spare_Tire_LP_Thresh_QKPH) for a predetermined time period (Spare_Tire_Counts_Limit). If the Lowpass filtered delta speed does exceed the limit, then a flag (Spare_Tire_Sensed) is set 240.

If an adequate number of sample periods have passed (No_Spare_Tire_Period_Limit) and the Spare_Tire_Sensed flag is not set, then a second flag is set to indicate that no spare tire was detected (No_Spare_Tire_Sensed) 240.

Figure 8:
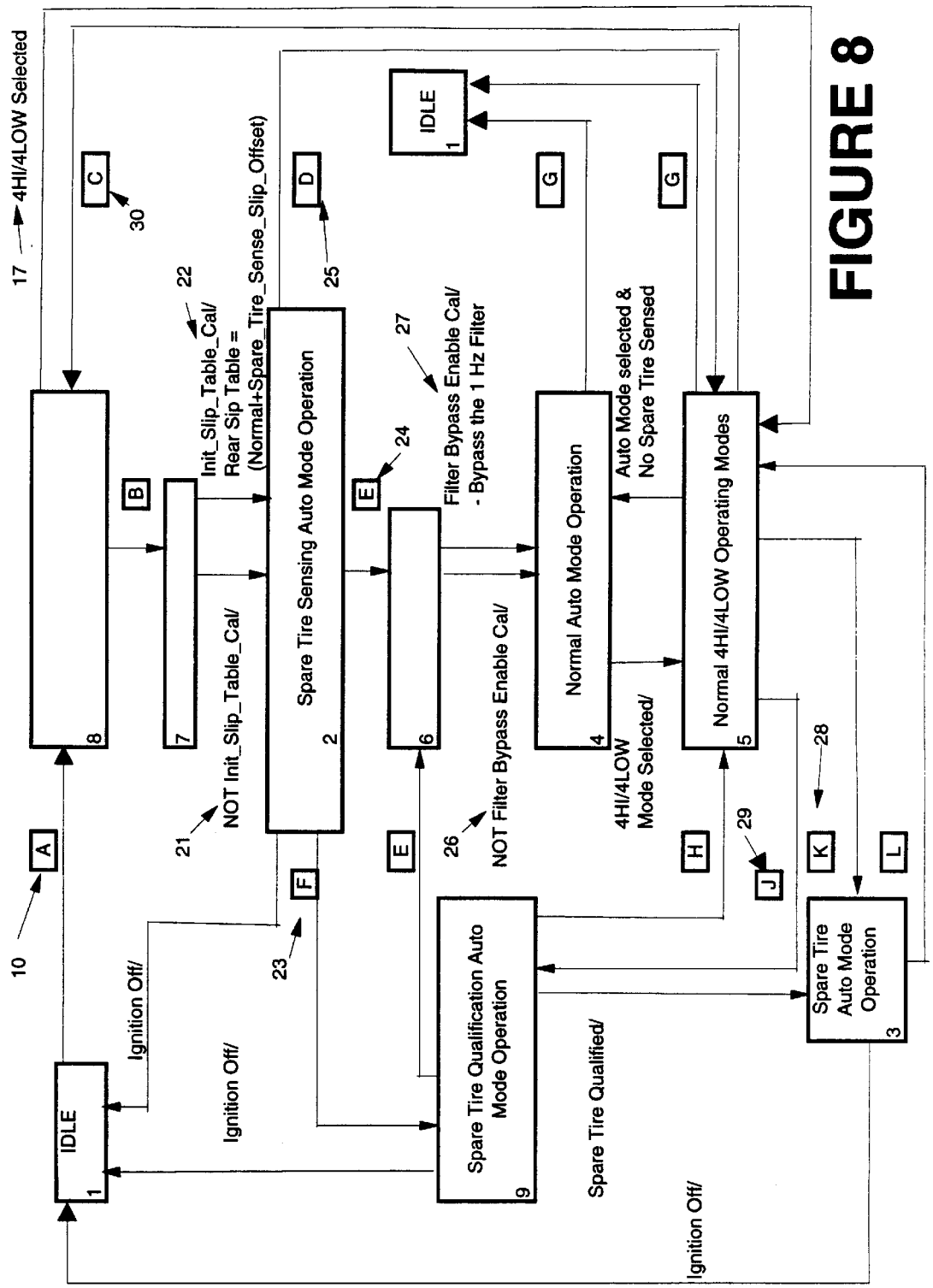

In a preferred embodiment, the variables described above have the following values:

Spare_Tire_Speed_Thresh_Kph=30 KPH
Max_Spare_Sense_Duty_Cycle=10%
Spare_Tire_Counts_Delay=5 seconds
Spare_Tire_LP_Thresh_QKPH=4 QKPH
Spare_Tire_Counts_Limit=4.9 seconds
No_Spare_Tire_Periods_Limit=5 Sample Periods Once one of the above flags is set 250 to indicate a spare tire is sensed, the test is preferably repeated to ensure accuracy in a spare tire qualification mode 260. If no spare tire is sensed, then a No_Spare_Tire_Sensed flag is set and the Spare_Tire_Sensed flag is cleared 250 and the vehicle returns to normal operation 210. In an alternative embodiment, the qualification is run if a spare tire is not sensed as well. If the result of the qualification test is consistent, then the Spare_Tire_Qualified flag is set to indicate a spare tire is detected (or low pressure) 260. In preferred embodiment, if the result is inconsistent, the first result is preferably discarded and the test repeated. In a preferred embodiment, the rear slip table values are increased by a predetermined amount Spare_Tire_Slip_Offset (1.5) prior to the qualification test, as illustrated in FIG. 8 at the left side of the Spare Tire Sensing Auto Mode Operation State 2. Note the events and actions are defined at FIGS. 8A and 8B for the sake of clarity in the Figures.

It is known in a motor vehicle to sense or calculate a throttle position and use the input from the throttle position to prepare the transfer case for an anticipated load, conditioning the clutch for application. In a preferred embodiment, any throttle position compensation strategy provided in the controller algorithm for 4 wheel drive operation is overridden during the spare tire sensing and qualification routines, or any such throttle position compensation must be below a calibratible duty. This ensures a quiet clutch during the spare tire routines.

If the No_Spare_Tire_Sensed flag is set, the controller 100 returns to normal operation 210. In a preferred embodiment, when the Spare_Tire_Sensed flag is set, the controller enters a mode 270 which includes a strategy to compensate for the effective radius difference as described below. If, during the spare tire mode 270, a change in state 280 is detected, then the vehicle returns to the normal operation 210. In a preferred embodiment, a change of state 280 includes shutting the vehicle off and restarting the vehicle or the vehicle speed being zero for 10 minutes when the brake is off. In an alternative embodiment, a change of state 280 comprises a flat tire being changed by the driver without shutting of the vehicle or observation of a large difference in speed for an extended period of time. In the alternative embodiment, a change of state is detected when, after a spare tire is detected and a prolonged idle state is detected, the controller 110 runs the tests 240, 250 to determine whether the tire has been changed.

One skilled in the art appreciates that, for the sake of clarity, the flow chart of FIG. 6 does not include all of the exit and entry conditions of the present invention for the Spare Tire Sensing 240, Spare Tire Qualification 260 and Spare Tire Auto 270 modes. One is referred to the state machine illustrated in FIG. 8 for a more comprehensive set of conditions. For example, when in the spare tire sensing operation 240 shown in FIG. 6, corresponding with FIG. 8 spare tire sensing auto mode operation 2, the failure to sense a spare tire 24 or selection of 4 Hi or 4 Lo modes 25 will cause the sensing routine 2 to be exited in a preferred embodiment. Similarly, the spare tire qualification state 9 may be entered from the normal 4 Hi or 4 Lo state 5. These examples are not exhaustive, and one is referred to FIG. 8 for more complete information.

In an alternative embodiment, instead of assuming no spare tire is present at startup, the status of the spare tire detection and qualification is reserved in KAM (step not shown). Thus when the vehicle is restarted, the controller 100 must detect that no spare tire is present, otherwise the flag previously set indicating a spare tire continues to indicate a spare tire and the compensation routine is enabled.

In a preferred embodiment, an indicator (not shown) is provided to display a message to the driver to indicate a spare tire is present or that a tire has lost inflation. The indicator may take the form of a computer display as in known driver information systems, an LED display, or illumination of a light in the cluster. The driver will thereby be made aware of the situation where a tire of differing effective diameter is detected, possibly indicating a tire with low pressure or a spare tire.

In an alternative embodiment, once the above flags are set, the tests 240, 250, are re-run periodically to determine whether a tire has lost pressure. Furthermore, such a test may be run if there is a detection of a difference value in rotational speed exceeding a calibratible level.

The low pass filter used in the present invention comprises a 1 Hz low pass filter $(2\Pi/(s+2*\Pi))$. The delta speed information passes through the low pass filter, which is limited to a calibratible value (Max_LowPass_Delta_Speed) to provide a low pass delta speed signal. The present invention uses the following equation:

$$Y_{1p}=(1-\beta)*U(k)+\beta*Y_{1p}(k-1)$$

In a preferred embodiment, U(k) corresponds to the difference value of the wheel speeds, $\beta=0.12$, and $Y_{1p}$ is the low pass filtered value. One skilled in the art recognizes the frequency may be varied and the value of $\beta$ may be calculated as described in the ''443 patent.

Once the low pass delta speed is calculated as described above, it is clamped, or limited, to a value Max_LowPass_Delta_Speed, which in a preferred embodiment is 2 KPH. A high pass delta speed is then calculated by subtracting the low pass delta speed from the measured delta speed as follows:

$$Y_{hp}=U(k)-Y_{1p}$$

Wherein $Y_{hp}$ is the high pass delta speed output. This high pass delta output is utilized by the controller to control the differential clutch.

By thus limiting the low pass delta speed and subtracting the low pass delta speed, the controller is able to control the drivetrain to provide torque when the wheels are slipping at a low rate of slip buildup (such as in sand) but which exceeds the maximum which would be encountered with a spare tire. Otherwise, without such a limit, the filtered high pass signal would be zero and the controller would not transfer torque as desired. However, with the present invention, the controller detects when a slow slip response is present but exceeds the maximum expected for a spare tire and makes a correction therefor. Thus, in the case where a spare tire is present, the delta speed from front to rear will increase slowly as vehicle speed increases to a maximum (based on tire size, etc.). However, as the vehicle encounters a slip situation such as sand, the maximum will be exceeded and thus the filtered value will be greater than zero and the controller will compensate for this situation. This maximum must be determined based on a particular vehicle configuration (2 KPH in the present example) and therefore set the Maximum Lowpass Delta Speed to further compensate for a vehicle's tolerance stackups which contribute to the delta speed.

The spare tire auto mode operation 270 comprises a routine which sets the operating parameters of the system to prevent bindup and excessive cycling when a spare tire is detected. The spare tire mode filters the low frequency differences in speeds and removes the values below one Hz. After these low frequency differences are removed, a system as described in the ''443 patent is used to compensate for the difference in effective diameters.

A state machine is provided in FIG. 8 to illustrate in more detail the process to detect a spare tire and operate the transfer case as described above. A state machine is described in some detail here with reference to FIG. 8 for the purpose of understanding a state machine generally. For a more detailed description of State Machines, one is referred to "Switching and Finite Automata Theory", Second Ed., authored by Kohavi, Zvi, published in New York by McGraw Hill, 1978, which is incorporated herein by reference.

Each box 1–9 shown in the state machine of FIG. 8 comprises a state. The controller operates in one of the states awaiting a transition. Several transitions are illustrated in the state machine, a first of which is indicated at 10. A transition 10 comprises an event 11, which upon occurrence, triggers one or more actions 12–15. So, for example, when in at idle in the first state 1, upon the first transition 10 where the first event 11 occurs, wherein the ignition is turned on, several actions 12–15 are commanded to clear spare tire flags and set the filter pole to 1 Hz . Whereupon a second state 6 is entered until another transition occurs where an action of selecting a mode occurs, such as at the Auto Mode selection transition 16 or the 4 Hi or 4 Low Mode Selection transition 17.

Upon the occurrence of the auto mode transition 16, actions 18–20 occur to set several variables and a third state 7 is entered. One of two transitions 21, 22 occur to establish the Slip_Table and the spare tire sensing state 2 is entered. If the transition 23 occurs wherein a spare tire is sensed, then the spare tire is qualified at state 9. If the transition 24 occurs wherein no spare tire is sensed, the normal auto mode state 4 is entered after an intermediate state 6 and a further transition 26 or 27 to determine whether to bypass the 1 Hz filter. If either 4 Hi or 4 Low mode is selected at state 25, then the vehicle enters the normal 4 Hi/4 Lo state 5. State 5 is exited if a transition occurs to enter the Auto mode 28–30, or the ignition is turned off or vehicle speed is zero for an extended period 31.

If the spare tire is qualified at state 9, after a transition 23 or 29, then the spare tire auto mode operation is entered at state 3. If no spare tire is sensed or if the vehicle is turned off or if 4 Hi or 4 Low is selected, then the appropriate state is entered.

The Spare tire Auto Mode state 3 is exited if the ignition is turned off or 4 Hi or 4 Low is selected, wherein the appropriate state is entered. Further steps in the state machine are apparent to one skilled in the art by following the directional arrows through the various transitions and states.

In a preferred embodiment, upon sensing a spare tire, the clutch operating parameters are modified as illustrated in the Spare Tire Auto Mode Operation State 3, which are summarized as follows:

Rear_Slip_Table_Values=Normal+1.5 KPH
Clutch_Increment_Rate=4 inc
ZZ_Thresh2_Limit=0.42

Thus, in a preferred embodiment as illustrated above, the values for the rear slip are increased by 1.5 KPH, the clutch increment rate is increased and the threshold at which the autolock is commanded is lowered from approximately 60% to approximately 42% of clutch duty cycle. Furthermore, in the state 7 before the routing to sense a spare tire is run, the initial values of the rear slip table are increased by a Spare_Tire_Sense_Slip_Offset of 0.5 KPH.

As described in the ''443 patent, the shaft speeds are measured and the delta speed is calculated. The delta speed is filtered as described above to provide the high pass delta output to remove low frequency components.

As will be appreciated by those skilled in the art in view of the present disclosure, removal of low frequency components from the difference value results in a value which is indicative of high frequency differences between the rotational speed of the front driveshaft and the rotational speed of the rear driveshaft. By removing the low frequency component, differences due to effective diameter differences will be removed, while during transient conditions, such as cornering, the high frequency components remain and will be accommodated by the controller.

A clutch PWM signal 140 is generated as a function of the filtered value as described below. Clutch PWM signal 140 is a fixed frequency signal with a duty cycle which is altered to have a minimal duty cycle when the filtered difference in rotational speeds between the front and rear driveshafts is below a calibratible slip allowance. Such a calibratible allowance is described in the '024 patent in columns 19–20 with reference to Table II. When the filtered value indicates a difference in rotational speed between the front and rear driveshafts exceeding a calibratible slip allowance, the duty cycle of clutch PWM signal 140 increases at a fixed interval to a maximum duty cycle, or until the filtered value indicates no high frequency differences between the rotational speeds of the front and rear driveshafts. Clutch PWM signal 140 preferably takes the form of a series of pulses, which has a fixed frequency, and a duty cycle, which varies to control the amount of slippage in clutch 135.

As described in the '443 patent, clutch PWM signal 140 is generated as a function of the filtered value. Clutch PWM signal 140 is a fixed frequency signal with a duty cycle which is altered to have a duty cycle of zero when the rotational speeds of the front and rear driveshafts are equal. When the filtered value indicates a difference in rotational speed between the front and rear driveshafts, the duty cycle of clutch PWM signal 140 increases at a fixed interval to 100%, or until the filtered value indicates no high frequency differences between the rotational speeds of the front and rear driveshafts. Clutch PWM signal 140 preferably takes the form of a series of pulses, which has a fixed frequency, and a duty cycle which varies to determine the amount of slippage in clutch 135.

In an alternative embodiment, the vehicle speed is used to determine the apply and decrement rate of the limited slip device. In this embodiment, below a vehicle speed of 16 KPH the decrement rate is 10%, while above 16 KPH the decrement rate is 2%. Thus, as the vehicle is turning on dry pavement, the torque transfer is decremented at a rate to prevent bindup. However, at higher speeds the limited slip device may be decremented more slowly.

In a further alternative embodiment, wheel sensors (not shown) are provided to measure wheel speed instead of the driveshaft sensors described above. In such an embodiment, the rotational speeds of the front and rear wheels are then used in a manner similar to that described above for the driveshaft speeds to determine a differential wheel speed and thus a spare tire under the entry conditions described below. Once the spare tire is detected, the operation of the transfer case may be modified as is further described herein.

Figure 7:
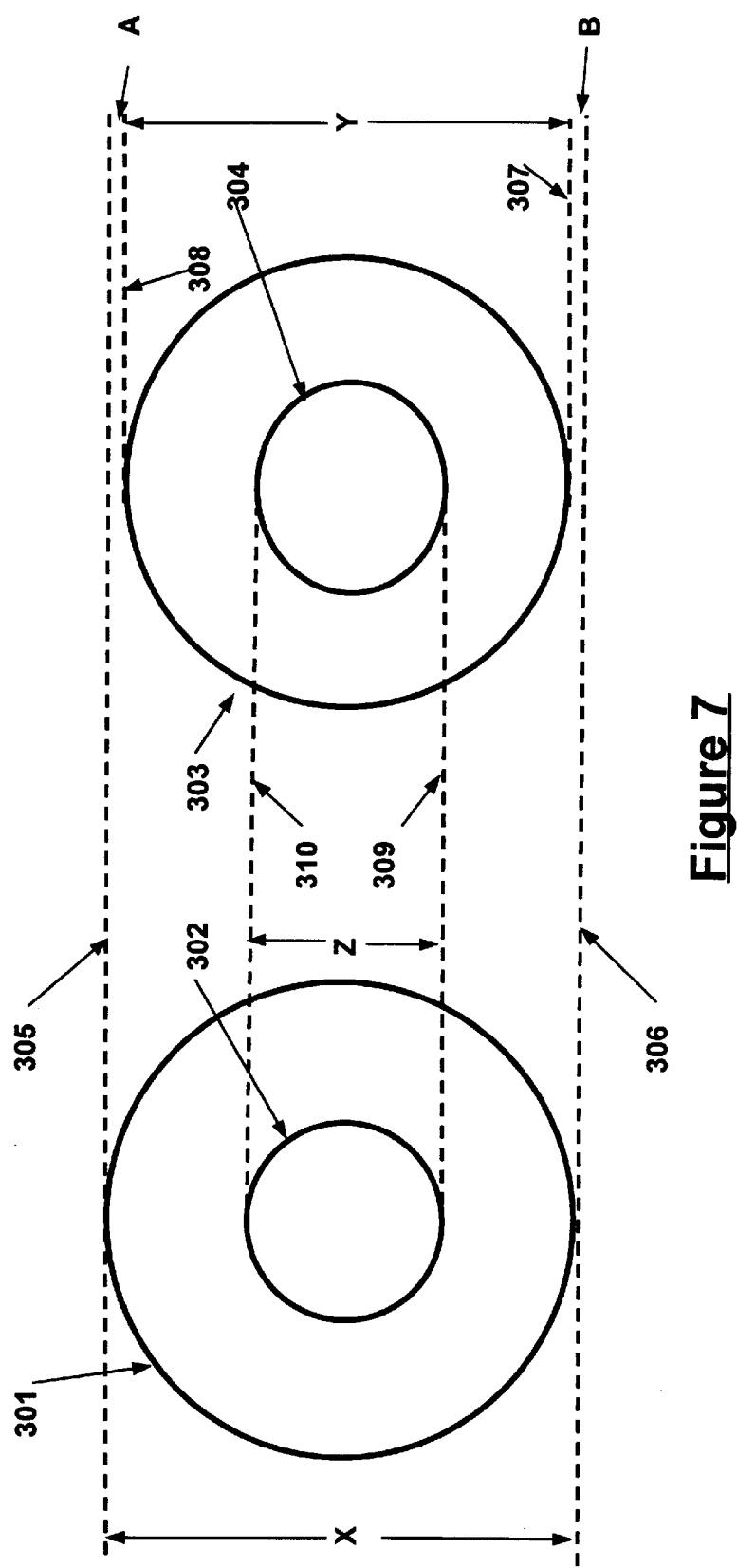
FIG. 7 is a diagram illustrating differing effective wheel diameters.

FIG. 7 shows a wheel 302 and tire 301 combination which has an effective wheel diameter X as delineated by lines 305 and 306. FIG. 7 also shows a wheel 304 and tire 303 combination which has an effective wheel diameter Y as delineated by lines 307 and 308. In FIG. 7, wheels 304 and 302 each have a radius of Z as delineated by lines 309 and 310. The effective wheel diameter of the two wheel and tire combinations however differs due to the diameters of the two tires, 301 and 303. As mentioned above, such a situation may occur if tires 301 and 303 are inflated to different air pressures or if the tires exhibit different flexing characteristics thus causing a different diameter even though the air pressure may be the same as in other tires. The wheel and tire combinations may also have differing effective wheel diameters if the wheels 302 and 304 are of different diameters. Such a situation may occur most commonly if minispare tire is used. Other mini-spare tires may present a situation as shown in FIG. 7 where the wheel diameter is the same as other wheels but the tire diameter is smaller than that of other tires. As used herein. The term effective wheel diameter is understood to be the outside diameter of a wheel and tire combination as shown at X or Y in FIG. 7.

The operation of the clutch is monitored by observing the PWM output commanded by the controller. The form of the signal is preferably the percentage PWM duty cycle. In a preferred embodiment, the clutch duty cycle varies between 4% and 98% with increments and decrements of approximately 10%. During strategy testing, the controller determines the current results when applying a 100% duty cycle to obtain the absolute amperes that relate to the duty cycle for calibration of the duty cycle.

We have discovered that it is useful to determine when the clutch is cycled past a lower threshold and an upper threshold a number of times over a predetermined time period to establish excessive clutch cycling. Upon detection of such excessive cycling of the clutch, the controller commands the clutch to operate in a mode similar to 4WD High. This causes the controller to exit the A4WD mode and enter a 4WD High mode and therefore the clutch is cycled less. In an alternative embodiment, the torque is monitored instead of the clutch duty cycle.

Figure 2:
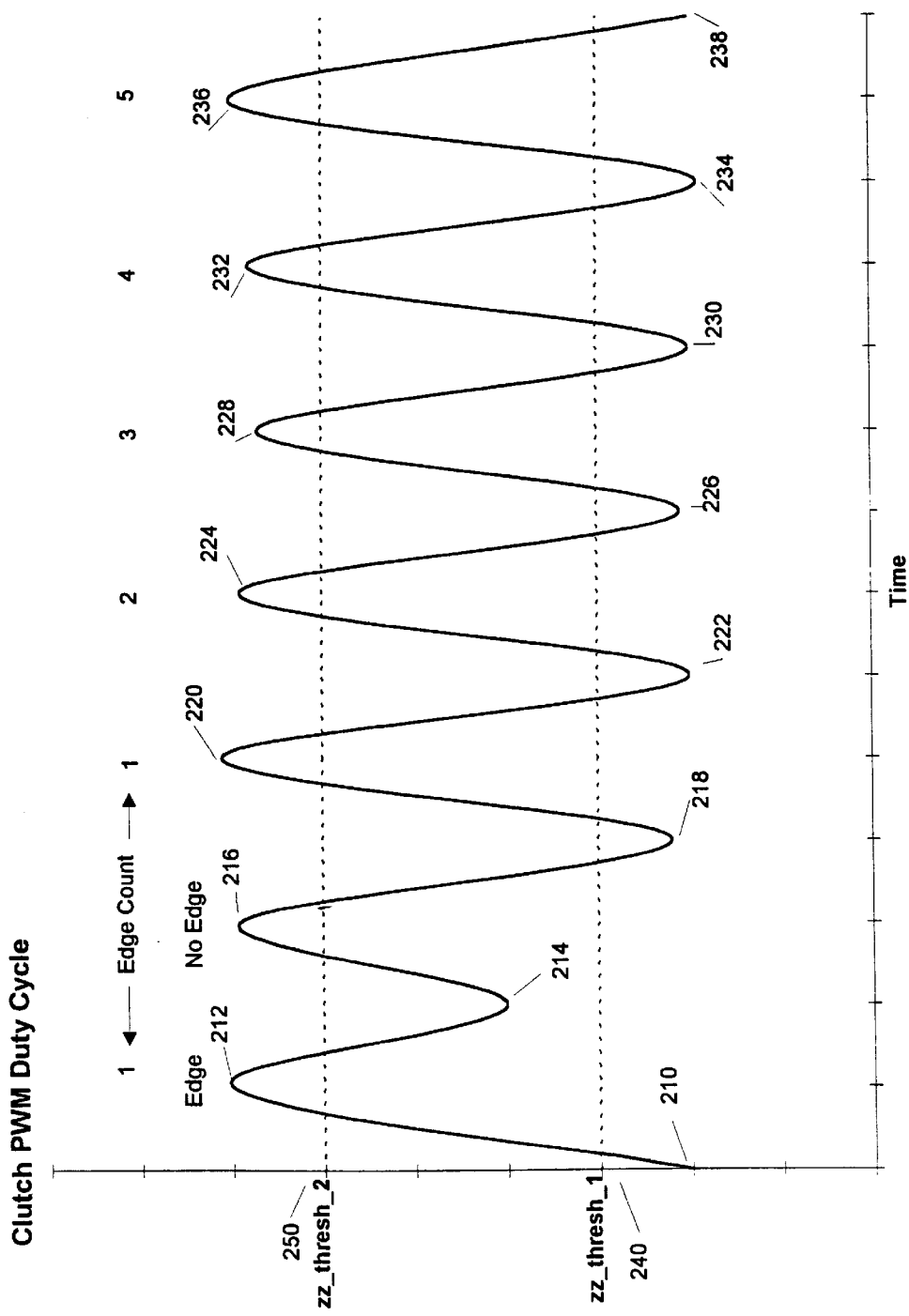
FIG. 2 illustrates a clutch duty cycle for a controller.

FIG. 2 illustrates an example of a clutch PWM duty cycle. In a preferred embodiment, the lower threshold, or zz_thresh_1, is 30% (duty cycle) and the upper threshold, or zz_thresh_2, is 60%. In an alternative embodiment, as described in the '210 [Spare Tire] Application, the upper threshold is adjusted when a spare tire is detected to 42%. As seen in FIG. 2, the duty cycle rises and falls based on the desired torque split, as determined by the controller. As the duty cycle passes both the upper threshold and lower threshold in the rising edge direction, an "edge" is observed and an edge counter is incremented.

In FIG. 2, the first measured PWM duty cycle 210 falls below the zz_thresh_1 240. As the duty cycle passes above zz_thresh_2 250 to a second duty cycle 212, an edge is observed. However, no edge is observed when the duty cycle drops from a value above the upper threshold to a value between the thresholds and rises again to a value above the upper threshold 212, 214, 216, because the lower value 214 was above the lower threshold 240.

Figure 3:
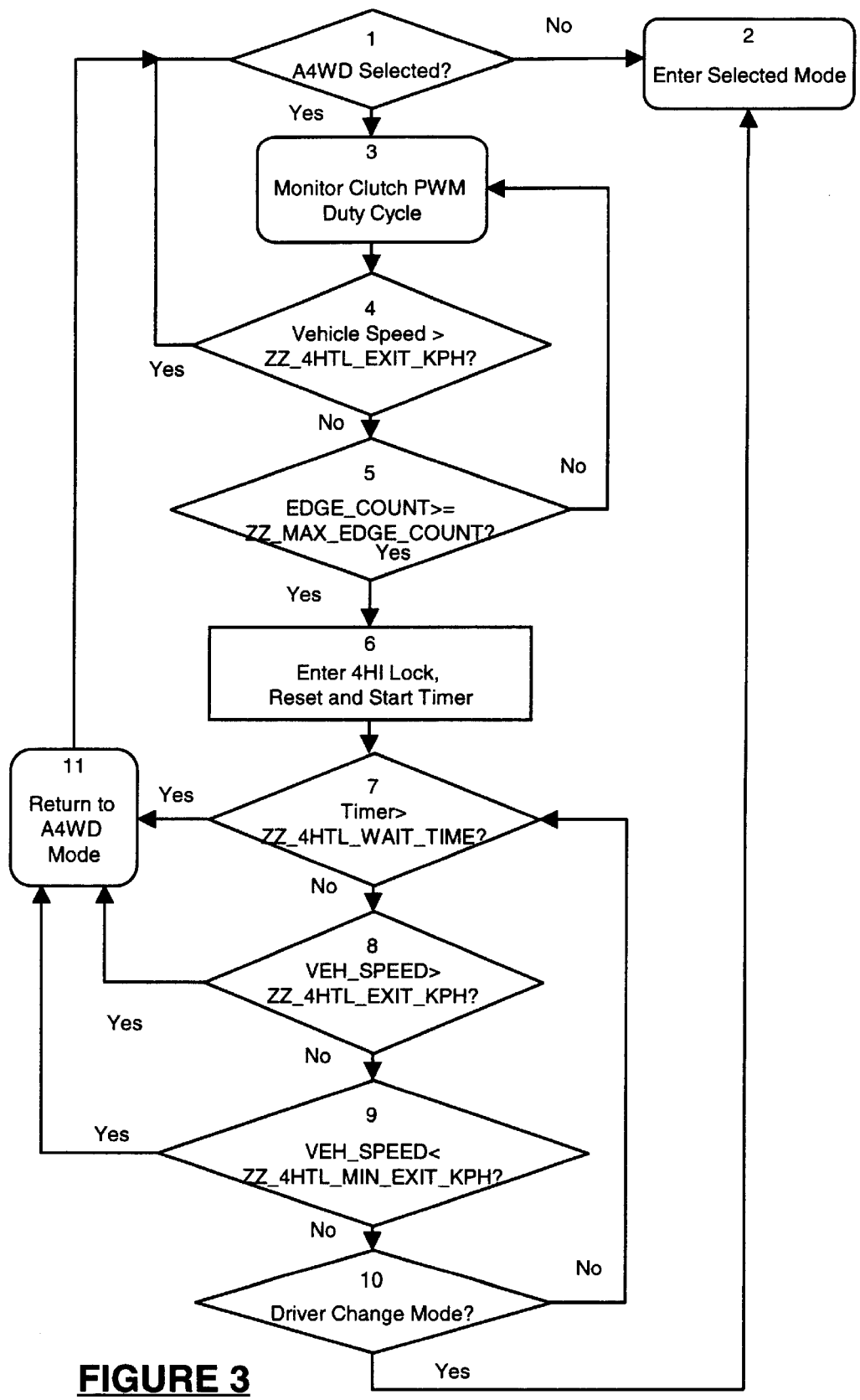
FIG. 3 is a flow chart illustrating the steps of a preferred embodiment.

As illustrated in the flow diagram provided in FIG. 3, during A4WD mode 1, the clutch PWM duty cycle is monitored 2 as described above. If a calibratible number of rising edges (zz_max_edge_count)are observed within a calibratible period of time (zz_sample_time) 5, excessive clutch cycling has occurred and 4WD High mode is commanded 6 if the vehicle speed is within a calibratible range 4, 5. In a preferred embodiment, the number of edges and time are ten edges and ten seconds, respectively. Preferably, the edge counts are accumulated over the zz_sample_time, then cleared and reaccummulated. The edge count is preferably cleared when the vehicle speed exceeds a calibratible limit (zz_4HTL_exit_kph) 4, in a preferred embodiment 72 KPH. Alternatively, one skilled in the art recognizes that equivalently a falling edge could be counted.

As shown in FIG. 3, when in A4WD mode 1, if the vehicle speed is within an acceptable range (below zz_4HTL_Entry_KPH, or preferably 56 KPH) and the edge count exceeds the calibratible maximum, a 4HI Lock mode (or Autolock mode) is entered 6. Preferably, edge counts are not monitored if the vehicle speed exceeds the zz_4HTL_Entry_KPH 5.

4 Hi Lock mode is exited, if during the 4HI Lock mode operation, the 4_Hi_Lock_Timer elapses 7 (zz_4HTL_wait_time, preferably 5 minutes) or the vehicle speed exceeds a calibratible limit 8 (zz_4HTL_exit_kph, preferably 72 KPH), or if the vehicle speed drops below a calibratible limit 9 (zz_4HTL_min_exit_kph, preferably 3 KPH) and A4WD is reentered 11. If the operator selects a drive mode other than A4WD 10, then 4 Hi Lock mode is exited and the selected mode is entered, if appropriate 2.

Figure 4:
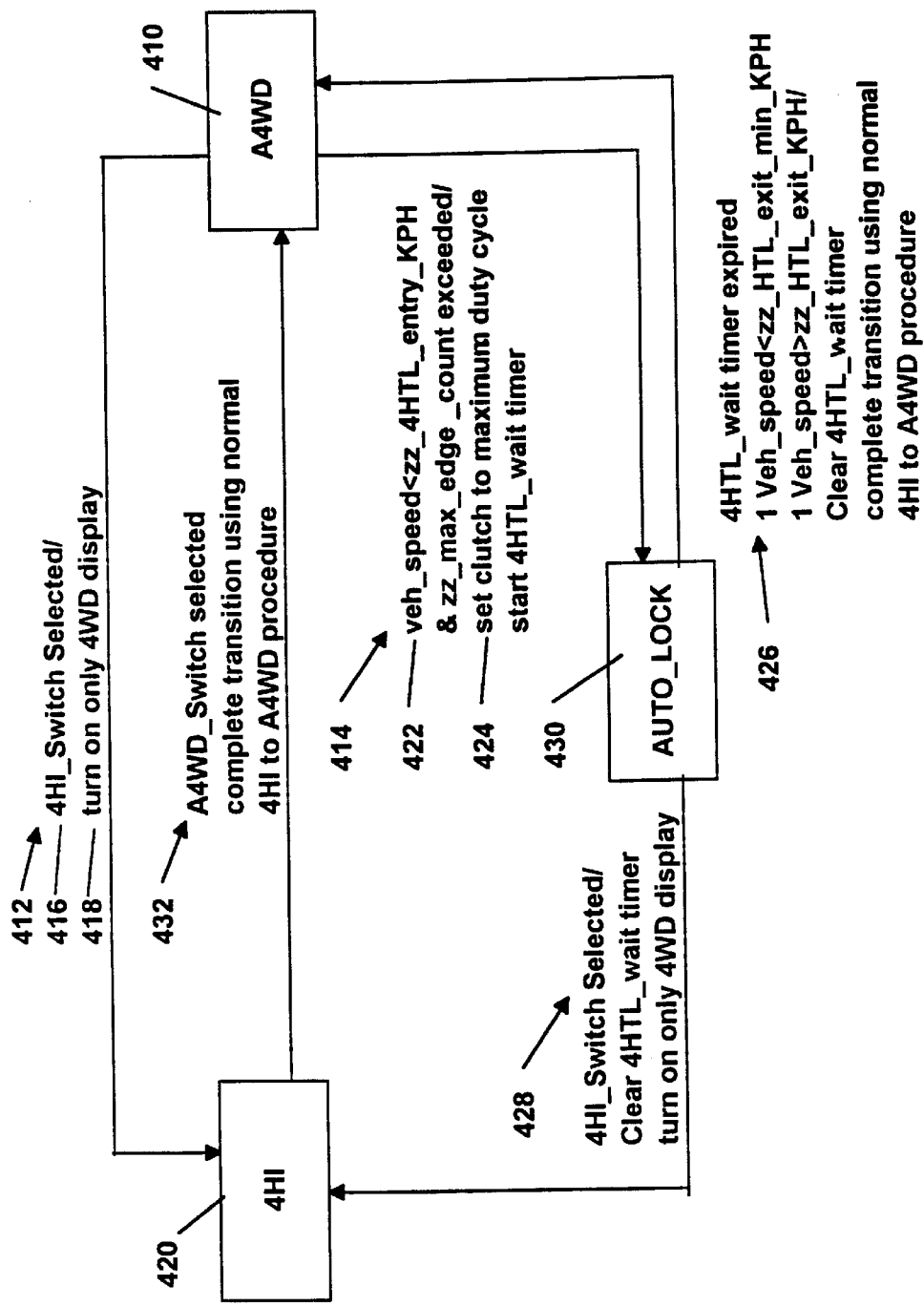
FIG. 4 is a state machine illustrating a preferred embodiment.

As illustrated in FIG. 4, a state machine is provided, including three states 410, 420, 430. In a first state 410, the vehicle is operating in A4WD mode. If either of two transitions 412, 414, occurs, then the appropriate state is entered 420, 430, respectively. In the first transition 412, a first event, 416 occurs, wherein a mode select switch, or MSS (not shown), is moved to a 4HI position. Thereafter, the controller turns on a 4WD display, such as a jewel or LED in the cluster (not shown) or adjacent the MSS switch. In a second transition 414, the event 422 occurs where the vehicle speed is below a calibratible threshold and a calibratible number of edge counts are observed as described above. Thereafter the Autolock state 430 is entered. The Autolock state is exited after an exit event 426, 428 occurs, including the 4HTL_timer expiring or the vehicle speed leaving an acceptable limit or the MSS is moved to a 4HI position. If the MSS is in the A4WD position, then the vehicle returns to an A4WD mode 426, 432.

Figure 5:
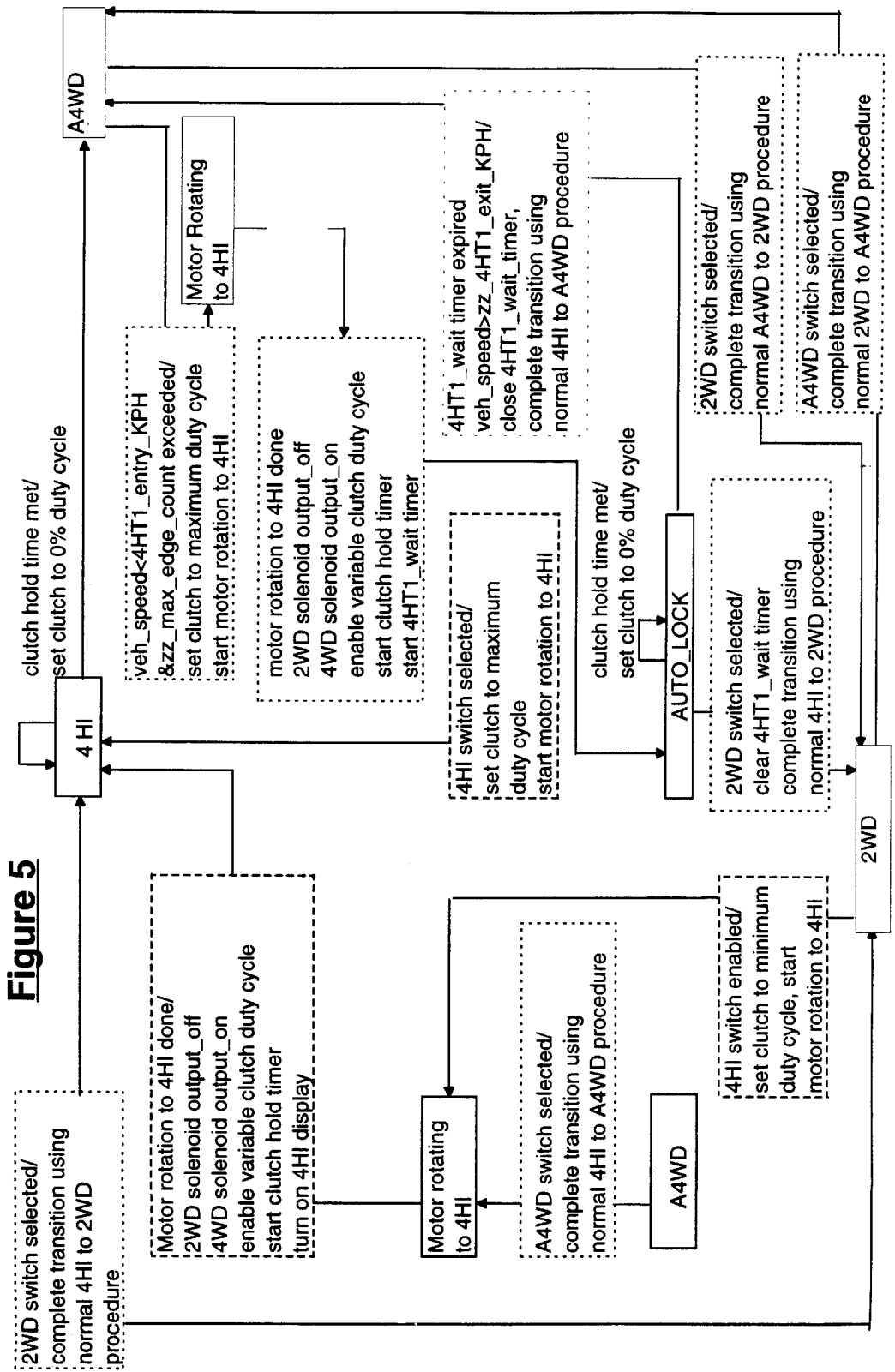
FIG. 5 is a second state machine illustrating a preferred embodiment in greater detail.

FIG. 5 illustrates in more detail a state machine including a 2WD mode. Because the relevant functions are understood with reference to the description provided above, FIG. 5 is not explained in further detail here.

As described in the [Spare Tire]'210 Application, when a tire having a smaller rolling radius is detected, it is desirable to control the transfer case with reference to the variation in wheel speed attributable to the wheel variation. A portion of the control which compensates for the smaller radius includes limiting the upper threshold, or zz_thresh_2 to 42%, as described above.

One skilled in the art recognizes that a mechanical clutch may be used in place of the electronically controlled clutch described herein. In such an instance, monitoring the duty cycle of the clutch comprises monitoring the amount of torque being transferred by the clutch.

It is to be understood that the specific mechanisms and techniques which have been described are merely illustrative of one application of the principles of the invention. Numerous modifications may be made to the methods and apparatus described without departing from the true spirit and scope of the invention.

We claim:

1. In a vehicle which includes a front driveshaft for transferring motive power to a front set of wheels and a rear driveshaft for transferring motive power to a rear set of wheels and a clutch to control the amount of torque provided to the driveshafts, a method of controlling the amount of power delivered to said front driveshaft and to said rear driveshaft, comprising, in combination, the steps of:

monitoring a duty cycle of the clutch;

determining whether the clutch duty cycle passes a first lower threshold and a second higher threshold, successively, a predetermined number of times within a calibratible time period; and entering into a 4 Hi Lock mode if the clutch duty cycle passes the first lower threshold and the second higher threshold, successively, a predetermined number of times within the calibratible period.

2. The method of claim 1, further comprising the step of monitoring whether one of the wheels has a smaller rolling radius than the other wheels and setting the second threshold to a third value if a smaller wheel is detected.

3. The method of claim 1, further comprising the step of determining the vehicle is in an A4WD mode prior to monitoring the duty cycle of the clutch.

4. The method of claim 3, wherein the mode is selectable, the method further comprising the step of exiting the 4 Hi Lock mode if the selected mode is changed from A4WD.

5. The method of claim 1, further comprising the step of monitoring the vehicle speed and entering 4 Hi Lock mode if the vehicle speed is within a calibratible range.

6. The method of claim 1, further comprising the step of starting a 4 Hi Lock timer after the 4 Hi Lock mode is entered.

7. The method of claim 6, further comprising the step of exiting the 4 Hi Lock mode when the timer expires.

8. The method of claim 7, further comprising the step of exiting the 4 Hi Lock mode if the vehicle speed exceeds a first calibratible level.

9. The method of claim 8, further comprising the step of exiting the 4 Hi Lock mode if the vehicle speed drops below a second calibratible level.

10. The method of claim 1, wherein the duty cycle is determined by measuring a percentage PWM duty cycle for an electronically controlled clutch.

11. The method of claim 1, wherein the duty cycle is determined by measuring the torque transferred by the clutch.

12. In an all-wheel drive vehicle which includes a front driveshaft for transferring motive power to a front set of wheels and a rear driveshaft for transferring motive power to a rear set of wheels and a clutch to control the amount of torque provided to the driveshafts, a method of controlling the amount of power delivered to said front driveshaft and to said rear driveshaft, comprising, in combination, the steps of:

determining the vehicle is operating in an A4WD mode;

monitoring the duty cycle of the clutch;

determining whether the clutch duty cycle passes a first lower threshold and a second higher threshold, successively, a predetermined number of times within a calibratible time period; and entering into a 4 Hi Lock mode if the clutch duty cycle passes the first lower threshold and the second higher threshold, successively, a predetermined number of times within the calibratible period.

13. The method of claim 12, further comprising the step of monitoring whether one of the wheels has a smaller rolling radius than the other wheels and setting the second threshold to a third value if a smaller wheel is detected.

14. The method of claim 12, wherein the mode is selectable, the method further comprising the step of exiting the 4 Hi Lock mode if the selected mode is changed from A4WD.

15. The method of claim 14, further comprising the step of monitoring the vehicle speed and entering 4 Hi Lock mode if the vehicle speed is within a calibratible range.

16. The method of claim 15, further comprising the step of starting a 4 Hi Lock timer after the 4 Hi Lock mode is entered and exiting the 4 Hi Lock mode when the timer expires.

17. The method of claim 16, further comprising the step of exiting the 4 Hi Lock mode if the vehicle speed exceeds a first calibratible level or if the vehicle speed drops below a second calibratible level.

18. In a vehicle which includes a front driveshaft for transferring motive power to a front set of wheels and a rear driveshaft for transferring motive power to a rear set of wheels and a transfer case having an electronically controlled clutch to control the amount of torque provided to the driveshafts, a method of controlling the amount of power delivered to said front driveshaft and to said rear driveshaft, comprising, in combination, the steps of monitoring a PWM duty cycle of the clutch;

determining whether the clutch PWM duty cycle passes below 30% duty cycle and a above 60% duty cycle, successively, a predetermined number of times within a calibratible time period; and entering into a 4 Hi Lock mode for a calibratible time period if the clutch duty cycle passes both 30% duty cycle and 60% duty cycle, successively, a predetermined number of times within the calibratible period.

19. The method of claim 18, further comprising the step of monitoring whether one of the wheels has a smaller rolling radius than the other wheels and entering into a 4 Hi Lock mode if the clutch duty cycle passes both 30% duty cycle and 42% duty cycle, successively, a predetermined number of times within the calibratible period if a smaller wheel is detected.

20. The method of claim 18, wherein the calibratible time period is 5 minutes and the mode is selectable, the method further comprising the step of determining the vehicle is in an A4WD mode prior to monitoring the duty cycle of the clutch and exiting the 4 Hi Lock mode if the selected mode is changed from A4WD.

* * * * *